US011059571B2

(12) United States Patent
Schmidt et al.

(10) Patent No.: US 11,059,571 B2
(45) Date of Patent: Jul. 13, 2021

(54) AIRCRAFT LANDING GEAR ASSEMBLY

(71) Applicant: Safran Landing Systems UK LTD, Gloucester (GB)

(72) Inventors: Robert Kyle Schmidt, Gloucester (GB); Neil Price, Gloucester (GB)

(73) Assignee: Safran Landing Systems UK LTD

( * ) Notice: Subject to any disclaimer, the term of this patent is extended or adjusted under 35 U.S.C. 154(b) by 612 days.

(21) Appl. No.: 15/950,701

(22) Filed: Apr. 11, 2018

(65) Prior Publication Data

US 2018/0304999 A1 Oct. 25, 2018

(30) Foreign Application Priority Data

Apr. 20, 2017 (EP) ..................................... 17167352

(51) Int. Cl.
*B64C 25/00* (2006.01)
*B64C 25/34* (2006.01)
*B64C 25/42* (2006.01)

(52) U.S. Cl.
CPC ............ *B64C 25/001* (2013.01); *B64C 25/34* (2013.01); *B64C 25/42* (2013.01); *B64C 2025/006* (2013.01)

(58) Field of Classification Search
CPC ....... B64C 25/42; B64C 25/34; B64C 25/001; B64C 25/36; B64C 2025/008;
(Continued)

(56) References Cited

U.S. PATENT DOCUMENTS 2,750,134 A 6/1952 Hawkins et al.
3,091,418 A * 5/1963 Pitt .......................... B64C 25/34
244/103 R
(Continued)

FOREIGN PATENT DOCUMENTS

EP 1437298 A1 7/2004
FR 1037210 A 9/2019
(Continued)

OTHER PUBLICATIONS

European Search Report for European Application No. 17167352.8, dated Aug. 30, 2017, 10 pages.
(Continued)

*Primary Examiner* — Assres H Woldemaryam
(74) *Attorney, Agent, or Firm* — RatnerPrestia

(57) ABSTRACT

An aircraft landing gear assembly having a main strut pivotally coupled to an aircraft, a bogie beam pivotally connected to the main strut, a first axle mounted at the first end of the bogie beam and arranged to carry one or more first wheel assemblies and brake assemblies, each first brake assembly being attached to the bogie beam by a brake rod, and a second axle mounted at a second end of the bogie beam and arranged to carry one or more second wheel assemblies and brake assemblies. A double acting actuator is coupled between the strut and the bogie beam to apply a compressive or tensile force to the bogie beam. The ends of the bogie beam are arranged to position the bogie pivot axis below a plane intersecting the axes of rotation of the first and second wheel assemblies when the strut is in the deployed condition.

16 Claims, 3 Drawing Sheets

(58) Field of Classification Search
  CPC ....... B64C 25/405; B64C 25/44; B64C 25/20;
        B64C 2201/12; B64C 2025/006; B64C
        2025/345; B64C 25/426; B64C 25/50;
        B64C 3/42
  See application file for complete search history.

(56) References Cited

U.S. PATENT DOCUMENTS

| | | | | |
|---|---|---|---|---|
| 4,328,939 | A * | 5/1982 | Davies | B64C 25/12 244/102 R |
| 5,110,068 | A * | 5/1992 | Grande | B64C 25/34 244/100 R |
| 6,032,090 | A * | 2/2000 | von Bose | G01G 19/07 177/136 |
| 9,266,606 | B2 * | 2/2016 | Goodburn | B64C 25/34 |
| 2009/0050736 | A1 * | 2/2009 | Bennett | B64C 25/58 244/102 R |
| 2012/0126055 | A1 * | 5/2012 | Lindahl | B64C 25/60 244/104 FP |
| 2016/0257398 | A1 * | 9/2016 | Bennett | B64C 25/34 |
| 2019/0016319 | A1 * | 1/2019 | Thompson | B60T 8/1875 |
| 2020/0198774 | A1 * | 6/2020 | Bennett | B64C 25/40 |

FOREIGN PATENT DOCUMENTS

| | | | | |
|---|---|---|---|---|
| GB | 932731 | | 7/1963 | |
| GB | 932731 | A * | 7/1963 | ............. B64C 25/22 |
| GB | 1006522 | | 10/1965 | |
| GB | 1006522 | A * | 10/1965 | ............. B64C 25/34 |
| GB | 2428650 | A | 2/2007 | |
| WO | 2011119283 | A1 | 9/2011 | |

OTHER PUBLICATIONS

Extended European Search Report for European Application No. 20 177 985.7, dated Sep. 3, 2020, 10 pages.
European Examination Report for European Application No. 20177985.7, dated Feb. 22, 2021, 6 pages.

* cited by examiner

AIRCRAFT LANDING GEAR ASSEMBLY

This application claims the benefit of and priority to European Application No. EP 17167352.8, filed on Apr. 20, 2017, the contents of which are incorporated herein by reference.

BACKGROUND

A known type of aircraft landing gear includes a main strut pivotally coupled to an elongate bogie beam. The bogie beam supports two or more axles, each of which carries a pair of wheel assemblies. A brake assembly is provided for each wheel assembly. Each brake assembly is coupled to a lower region of the main strut, which projects below the bogie beam, by a brake rod. The brake rods are arranged parallel and offset with respect to the bogie to provide force cancellation during braking so as to avoid brake torque being transferred to the bogie beam.

A different type of known landing gear includes brake rods which couple the brake assemblies to the bogie beam. Such an arrangement will be referred to as a "bogie anchored" landing gear. A bogie anchored landing gear does not provide force cancellation during braking and, as such, a compensating actuator is provided between the main strut and bogie beam to apply a compensating force to the bogie beam during braking.

The present inventors have identified that the weight of a bogie anchored landing gear can be reduced.

SUMMARY

In accordance with a first aspect of the invention there is provided an aircraft landing gear assembly having: a main strut having a mounting lug at one end region via which it is arranged to be pivotally coupled to an aircraft so as to be movable between a stowed condition for flight and a deployed condition for take-off and landing; an elongate bogie beam comprising first and second end regions connected by a central body portion at which the bogie beam is pivotally coupled to the main strut via a bogie pivot pin; a first axle mounted at the first end region of the bogie beam, the first axle being arranged to carry one or more first wheel assemblies and first brake assemblies, each first brake assembly being coupled to the first axle or the bogie beam such that the first axle or the bogie beam inhibits rotation of the first brake assembly relative to the first axle when braking; a second axle mounted at the second end region of the bogie beam, with the bogie pivot pin between the first and second end regions, the second axle being arranged to carry one or more second wheel assemblies and second brake assemblies; and an actuator coupled between the main strut and the bogie beam and operable to extend to apply a compensating force to the bogie beam during braking, wherein the end regions of the bogie beam are arranged to position the bogie pivot axis below the plane intersecting the axes of rotation of the first and second wheel assemblies when the main strut is in the deployed condition.

Thus, the aircraft landing gear assembly according to the first aspect enables the size and/or weight of a compensating actuator to be reduced by positioning the bogie pivot axis below the longitudinal axes of the wheel axles in order to reduce the pitching moment on the bogie due to braking.

In accordance with a second aspect of the invention there is provided an aircraft landing gear assembly having: a main strut having a mounting lug at one end region via which it is arranged to be pivotally coupled to an aircraft; an elongate bogie beam pivotally coupled to the main strut via a bogie pivot pin; a first axle mounted at a first end region of the bogie beam, the first axle being arranged to carry one or more first wheel assemblies and first brake assemblies, each first brake assembly being coupled to the first axle or the bogie beam such that the first axle or the bogie beam inhibits rotation of the first brake assembly relative to the first axle when braking; a second axle mounted at a second end region of the bogie beam, with the bogie pivot pin between the first and second end regions, the second axle being arranged to carry one or more second wheel assemblies and second brake assemblies; and a double acting actuator coupled between the main strut and the bogie beam to apply a compressive or tensile force to the bogie beam, wherein the bogie pivot pin is located closer to the second axle than the first axle.

Thus, the aircraft landing gear assembly according to the second aspect enables the size and/or weight of a compensating actuator to be reduced by positioning the bogie pivot closer to the rear axle than the front axle. Positioning the bogie pivot closer to the rear axle than the front axle make the assembly relatively unbalanced when stationary, but relatively balanced under braking. Given that static loads are lower in magnitude than loads under braking, the compensating actuator can be smaller and/or lighter than in conventional arrangements. The compensating actuator is a double acting actuator that can be driven to extend and retract and therefore can apply a positive or negative force between the bogie beam and strut from the balanced position under braking.

The end regions may extend from the central body portion at an angle of between 20° and 70°.

A controller may be provided and configured to control operation of the actuator. Such controller may be configured to cause the actuator to apply a pushing force to the bogie beam when the aircraft weight on wheels is detected and the brakes are not braking in order to achieve a substantially even weight distribution between the first and second wheel assemblies. Such controller may be configured to cause the actuator to reduce the pushing force applied to the bogie beam in accordance with a detected level of brake torque applied to the first and second wheel assemblies. Such controller may be configured to cause the actuator to apply a pulling force to the bogie while a relatively high level of brake torque is detected as being applied to the first and second wheel assemblies. A controller may be configured to cause the actuator to apply a pulling force to the bogie during taxiing turning manoeuvres to lift the first wheel assemblies off the ground during taxiing turning manoeuvres. A controller may be configured to cause the actuator to position the bogie beam so as to be parallel with respect to a longitudinal axis of the aircraft.

The first axle may define a first wheel mounting portion on a first side of the bogie beam for supporting the first wheel assembly, the second axle may define a second wheel mounting portion on the first side of the first bogie beam for supporting the second wheel assembly, and the landing gear assembly may further include: a second elongate bogie beam including a second mounting formation, defining a second bogie pivot axis, via which the second bogie beam is arranged to be pivotally mounted to the aircraft landing gear main strut in a side by side adjacent relationship with the first bogie pivot axis being coaxial with respect to the second bogie pivot axis; a third axle mounted at a first end region of the second bogie beam, the third axle defining a third wheel mounting portion on a second side of the second bogie beam for supporting a first wheel assembly, the second side facing away from the first bogie beam; and a fourth axle mounted at a second end region of the second bogie beam, the fourth axle defining a fourth wheel mounting portion on the second side of the bogie beam for supporting a fourth wheel assembly. The aircraft landing gear assembly according also may include a second double acting actuator coupled between the main strut and the second bogie beam to apply a compressive or tensile force to the second bogie beam, and the bogie pivot pin may be located closer to the fourth axle than the third axle. The end regions of the first and second bogie beams both may be arranged to position the bogie pivot axis below a plane intersecting the axes of rotation of the first to fourth wheel assemblies when the main strut is in the deployed condition.

Each brake assembly may be coupled to the axle on which it is mounted or the bogie beam such that the axle upon which it is mounted or the bogie beam inhibits rotation of the respective brake assembly relative to the respective axle when braking.

Each brake assembly may be attached to a brake rod which in turn is attached to the bogie beam.

Each brake assembly may be coupled to the axle on which it is mounted or the bogie beam such that the axle upon which it is mounted or the bogie beam inhibits rotation of the respective brake assembly relative to the respective axle when braking.

Each brake assembly may be attached to a brake rod which in turn is attached to the bogie beam.

In accordance with a third aspect of the invention, there is provided an aircraft landing gear assembly comprising some or all of the features of the first aspect in combination with some or all of the features of the second aspect.

In accordance with a fourth aspect of the invention, there is provided an aircraft including an aircraft landing gear assembly according to the first, second and/or third aspect.

BRIEF DESCRIPTION OF THE DRAWINGS

Embodiments of the invention will now be described with reference to the accompanying drawings, in which.

DETAILED DESCRIPTION

Figure 1:
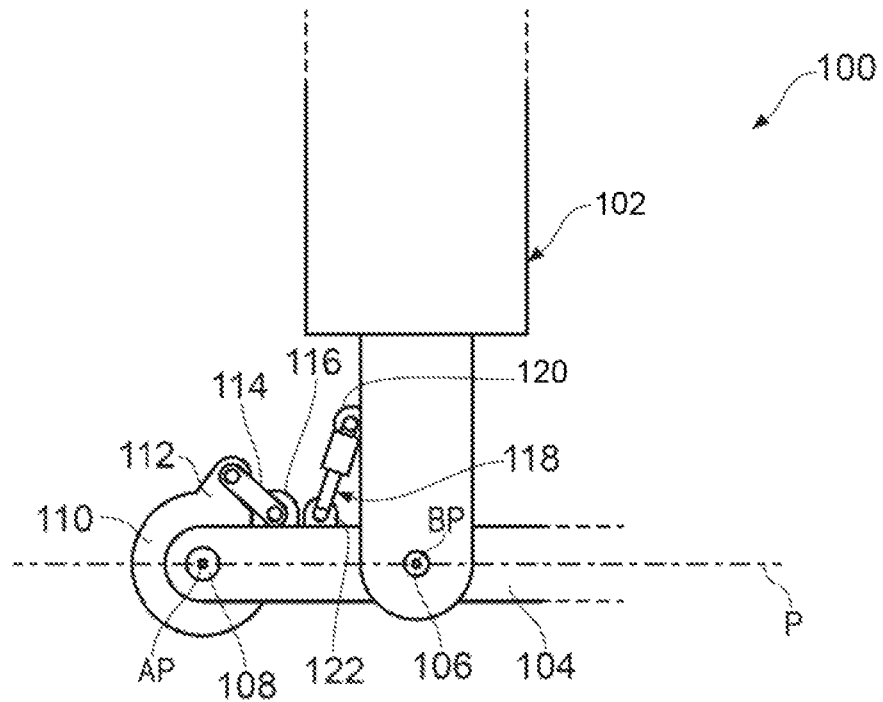
FIG. 1 is a schematic side view of a known bogie anchored aircraft landing gear assembly.

FIG. 1 illustrates a known aircraft landing gear assembly generally at 100.

The landing gear assembly 100 includes a main strut 102 which is movably coupled to an aircraft (not shown). The main strut 102 is a shock absorbing strut, but could be rigid. A bogie beam 104 is pivotally mounted at a lower end of the main strut 102 via a pivot pin 106.

The bogie pivot axis BP is in the same plane P as the axle pivot axes AP, or can be slightly above it.

The bogie beam 104 carries fore and aft axles 108 for mounting wheel assemblies (not shown). The aft axle has been omitted for clarity. Each wheel assembly is provided with a brake assembly 110 arranged to apply a brake torque to the wheel assembly to slow the aircraft. Each brake assembly 110 includes a lug 112 attached to one end of a respective brake rod 114. The other end of each brake rod 114 is attached to a respective mounting lug 116 on the top surface of the bogie beam 104. As such, the landing gear assembly is a bogie anchored landing gear assembly.

A compensating actuator 118 is provided between the main strut 102 and bogie beam 104 to apply a compensating force to the bogie beam 104 during braking. The compensating actuator 118 is coupled between a strut mounting lug 120 and a bogie beam mounting lug 122.

The present inventors have identified that the weight of known landing gear can be reduced.

Figure 2:
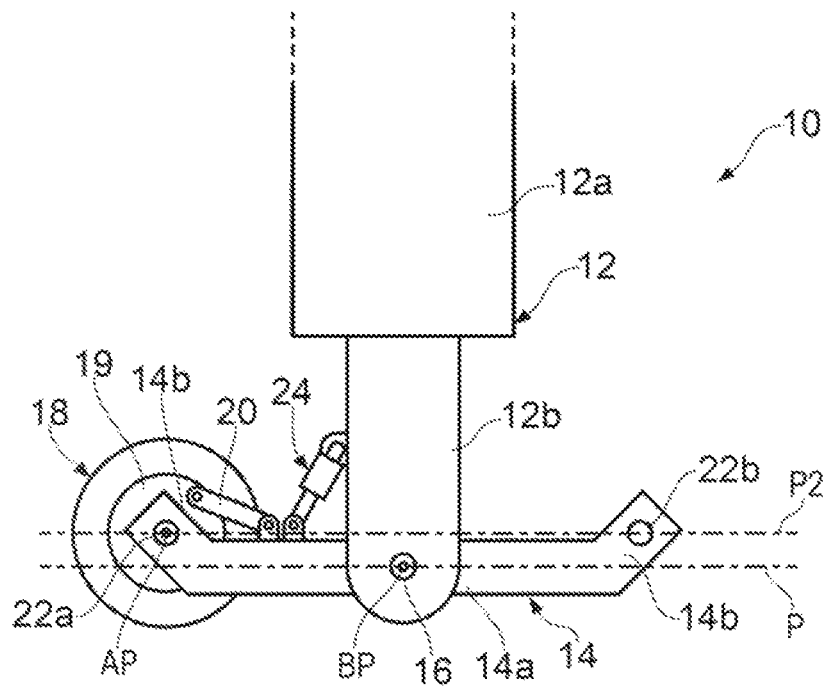
FIG. 2 is a schematic side view of a bogie anchored aircraft landing gear assembly according to an embodiment of the present invention.

FIG. 2 is a diagram of part of an aircraft; more specifically, an aircraft landing gear assembly 10 according to an embodiment of the invention.

The aircraft landing gear assembly 10 includes a main strut 12 which is movably coupled to the airframe (not shown). The main strut 102 is a conventional shock absorbing strut, having an upper cylinder 12a within which a lower tube 12b is slidably mounted. However, in other embodiments, the main strut could be rigid.

A bogie beam 14 is pivotally mounted at a lower end of the sliding tube 12b via a pivot pin 16 located midway along the bogie beam 14. The bogie beam 14 has an elongate, central body portion 14a which is generally straight. The bogie beam 14 has raised end portions 14b which project upwardly and away from the central body portion 14a at an angle of approximately 45°. However, in other embodiments the end portions can take any suitable configuration; for example, the end portions 14b can extend away from the body portion 14a on the same side of the bogie beam 14 but in opposite directions at an angle of between 20° and 70°. Each end portion 14b is arranged to support a wheel axle 22. Wheel assemblies 18 are mounted on the axle 22. The brake assembly 19 of each wheel assembly 18 is connected to the bogie beam 14 via a brake rod 20 such that the landing gear assembly is a bogie anchored landing gear assembly.

Thus, the landing gear assembly 10 according to the illustrated embodiment includes a bogie beam having upturned end regions 14b which mount the wheel axles 18 above the bogie pivot pin 16. More specifically, a plane P2 which intersects the axle pivot axis AP of each axle 22 is above and spaced from a parallel plane P which intersects the bogie pivot axis BP. The present inventor has identified that this arrangement reduces the pitching moment on the bogie beam 14 which arises due to braking. As such, this arrangement can reduce the load required from a compensating actuator 24, meaning that a smaller, lighter compensating actuator 24 can be provided.

The specific shape of the bogie beam is not important providing it is arranged to position of the axles above the pivot pin in order to reduce the vertical distance between the tire/ground contact point and the pivot pin. It is preferred that the bogie beam has a wave like or serpentine shape to avoid sharp corners.

Figure 3:
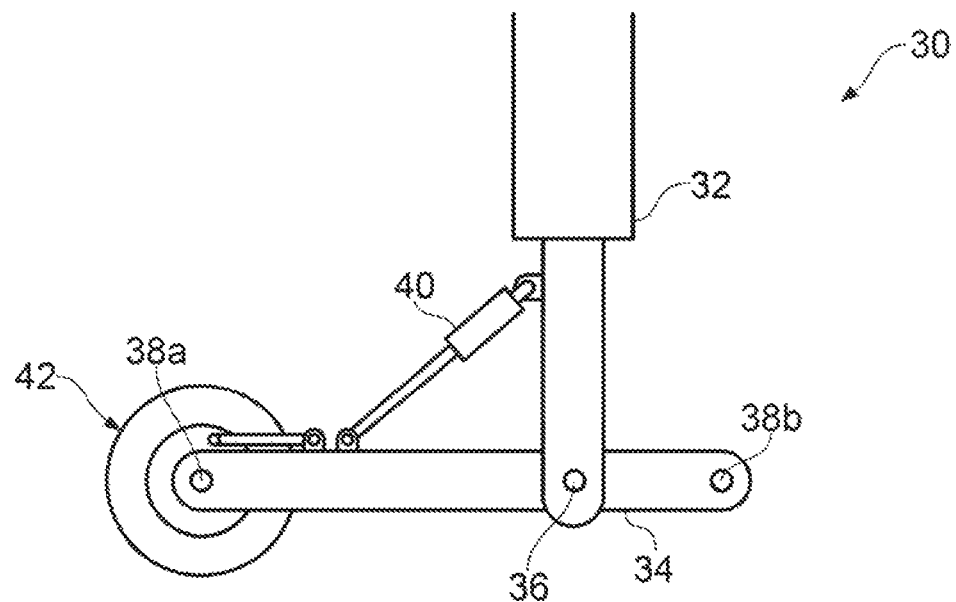
FIG. 3 is a schematic side view of a bogie anchored aircraft landing gear assembly according to another embodiment of the present invention.

FIG. 3 shows an aircraft landing gear assembly according to a further embodiment of the invention generally at 30. The aircraft landing gear assembly 30 is similar to the aircraft landing gear assembly 10 and for brevity the following description will focus on the differences.

Rather than having a bogie beam having upwardly extending end regions, the bogie beam 34 of the illustrated embodiment is straight so as to place the axles 38 in line with the bogie pivot pin 36. However, rather than being centrally located on the bogie beam 34, the bogie pivot 36 is closer to the rear axle 38b than the front axle 38a. As such, vertical load static load is not evenly shared between the front and rear tire pairs; rather, the rear tires carry more weight than the front tires.

The bogie pivot pin 36 is located such that, for a specific brake torque and aircraft weight, the vertical load on the front and rear brake pairs is substantially equalized under braking.

The vertical load and the brake torque are variable during aircraft operations. As such, no single bogie pivot pin location can ensure a constant force balance under braking. However, the offset configuration of the illustrated embodiment can nevertheless minimise the size of compensation actuator required in order to correct for variations.

The compensation actuator 40 of the illustrated embodiment is a dual acting actuator that can be driven to extend or contract. As such, the compensation actuator 40 can apply a push force or a pull force between the main strut 32 and the bogie beam 34.

When braking is not occurring, the actuator 40 is controlled to push the bogie beam 40 to achieve a nominally even distribution of load between the front wheel assembly 42 and the back wheel assembly (not shown).

During braking application, the force required from the compensating actuator 40 is reduced to zero.

Under extreme braking conditions, the compensating actuator 40 can be controlled to pull the bogie beam 34 in order to compensate for the additional load on the front wheel assembly 42.

A suitable control program can be executed by a controller located within the aircraft, or mounted on the landing gear assembly. This control system can control operation of the compensation actuator 40 dynamically based on measured or estimated brake torque and taking the instantaneous flight phase into account.

As a compensation actuator 40 can provide significant forces, it can be used to further reduce the weight of the landing gear by reducing cornering loads. As in the above configuration, with the actuator at zero load, the vertical load of the aircraft would be taken predominantly by the rear tire pair, the actuator can be scheduled to pull during turning maneuvers (by relating the nose wheel steering angle to the amount of pull demanded). In extreme turning cases, this will have the effect of reducing the apparent vertical load on the forward tires, hence reducing the friction force at the interface with the ground, and reducing the total turning torque load imparted to the landing gear. As this torque is a significant design driver for bogie landing gears, the structure can be reduced in weight.

The actuator can be employed to perform tasks well known in the art: positioning the bogie in flight for stowage or landing as well as biasing the bogie in one direction during take-off (controlled articulation).

However, by measuring the position of the bogie, or the length of the actuator, the actuator can be scheduled in flight to align the bogie to the airflow, using the aircraft angle from the on-board aircraft system as an input to the bogie pitch-trimmer control system. It has been shown that aligning the bogie to the airflow direction can significantly reduce the radiated aero-acoustic noise of the landing gear.

Figure 4:
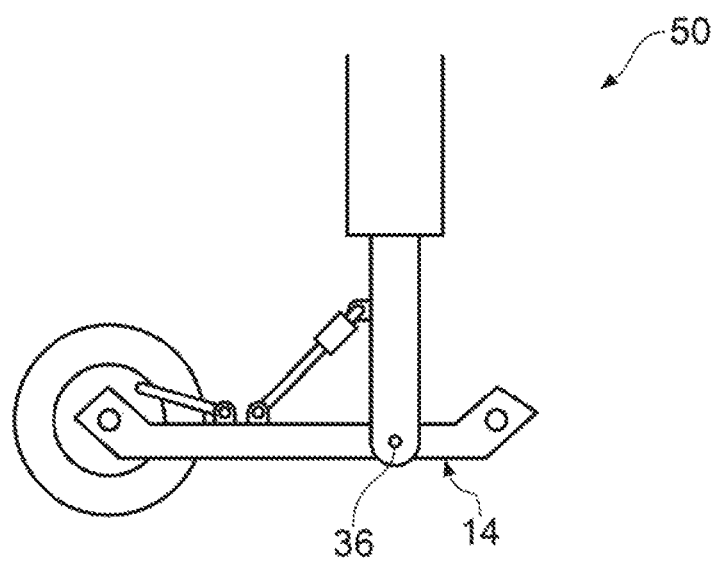
FIG. 4 is a schematic side view of a bogie anchored aircraft landing gear assembly according to another embodiment of the present invention.

FIG. 4 shows an aircraft landing gear assembly according to a further embodiment generally at 50. The aircraft landing gear assembly 50 combines both the bogie beam 14 of the embodiment described with reference to FIG. 2 with the offset pivot pin 36 of the embodiment described with reference to FIG. 3, thereby combining the weight saving capabilities of the two arrangements.

Redundancy can be built into the compensation systems through various means known in the art and typically employed on flight control actuators: two parallel compensating actuators could be employed, each powered by a separate electrical and/or hydraulic circuit and control system or a single actuator could be used with two independent pistons driven by independent hydraulic circuits. The choice will depend on the aircraft architecture and the volume available; two parallel actuators would typically be placed side by side, although it would be possible to position two different actuators fore and aft, whereas an architecture with two separate pistons/chambers acting on the same rod would be longer than a single actuator and may not fit in the space available. The actuators are sized to ensure between 50% and complete compensation in the event of a failure of one actuator/system.

Figure 5:
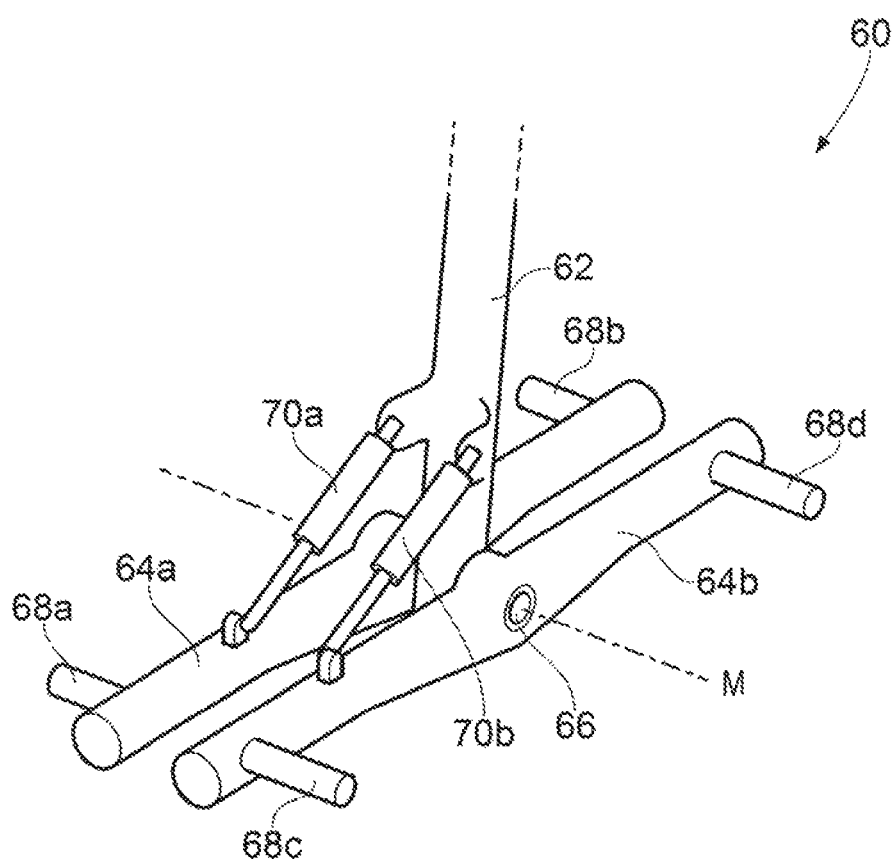
FIG. 5 is a perspective view of a bogie anchored aircraft landing gear assembly according to another embodiment of the present invention.

FIG. 5 shows an aircraft landing gear assembly 60 according to a further embodiment of the invention. The aircraft landing gear assembly 60 is similar to the landing gear assembly of FIG. 4 and for brevity the following describing will focus on the differences.

The landing gear assembly 60 includes first and second bogie beams 64a, 64b arranged to be mounted in a parallel side by side relationship. The bogie beams 64a, 64b each include identical pivot bearings arranged to receive a common bogie pivot pin 66, or coaxial bogie pivot pins, so that the bogie beams 64a, 64b pivot about a common bogie pivot axis M.

At a first end, the first bogie beam 64a includes a conventional mounting bushing by which a first axle 68a is mounted. The second bogie beam 64b includes a corresponding mounting bushing which carries a third axle 68c. The first and third axles 68a, 68c are aligned with a common axis when the bogie beams 64a, 64b are aligned in registration with one another i.e. in the same plane.

Similarly, a second end of the first bogie beam 64a includes a conventional mounting bushing which mounts a second axle 68b and the second end of the second bogie beam 64b includes a conventional mounting bushing which mounts a fourth axle 68d.

Each axle 68a-d, is arranged to mount a single wheel assembly.

A first compensating actuator 70a is provided between the main strut 62 and first bogie beam 64a to apply a compensating force to the first bogie beam 64a during braking. A second compensating actuator 70b is provided between the main strut 62 and second bogie beam 64b to apply a compensating force to the second bogie beam 64b during braking. In this case, each bogie has a compensating actuator sized to manage the torque generated by two brakes.

Thus, two parallel bogie beams are provided in a 'dual bicycle' arrangement in which the bogie beams can pivot about their mounting axes independently. Such an arrangement provides braking compensation redundancy by having a pair of independently operable compensating actuators acting on distinct bogie beams. The brakes and compensating actuator on the inboard bogie can be controlled and powered by one system, and the brakes and compensation on the outboard controlled by a second, independent system. In the event of a failure of one system, the other is therefore isolated and unaffected. This arrangement is also advantageous over an arrangement in which redundancy is provided by a pair of actuators acting on a common bogie beam because each actuator need only be sized to compensate for pitching moment induced by the brake assemblies on one side of the landing gear assembly, which can provide a weight advantage.

In other embodiments, the landing gear assembly 60 can have just one of the relatively low bogie pivot axis of the embodiment described with reference to FIG. 2 and the offset pivot pin 36 of the embodiment described with reference to FIG. 3.

While the landing gear assemblies of the illustrated embodiments have brake assemblies coupled to the bogie beams by brake rods, in other embodiments the brake assemblies can be rotationally fixed relative to the bogie beam by any suitable means such as splines or a flange on the axle, or any other mechanism where the brake is fixed rigidly to the axle and/or bogie beam so as to cause a pitching moment on the bogie under braking which is greater than the pitching moment created in a conventional arrangement where the brake rods are arranged parallel and offset with respect to the bogie to provide force cancellation during braking.

Landing gear assemblies according to embodiments of the invention can be formed of conventional aerospace materials, such as stainless steel, aluminum or titanium.

Landing gear assemblies according to embodiments of the invention can be main landing gear assemblies for medium to large aircrafts.

Although the invention has been described above with reference to one or more preferred embodiments, it will be appreciated that various changes or modifications can be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. An aircraft landing gear assembly comprising:
a main strut having a mounting lug at one end region via which the main strut is arranged to be pivotally coupled to an aircraft so as to be movable between a stowed condition for flight and a deployed condition for take-off and landing;
an elongate bogie beam comprising a front end region and a rear end region connected by a central body portion at which the bogie beam is pivotally coupled to the main strut via a bogie pivot pin;
a first axle mounted at the front end region of the bogie beam, the first axle being arranged to carry one or more first wheel assemblies and first brake assemblies, each first brake assembly being coupled to the first axle or the bogie beam such that the first axle or the bogie beam inhibits rotation of the first brake assembly relative to the first axle when braking;
a second axle mounted at the rear end region of the bogie beam, with the bogie pivot pin between the front end region and the rear end region, the second axle being arranged to carry one or more second wheel assemblies and second brake assemblies; and
an actuator coupled between the main strut and the bogie beam and operable to extend to apply a compensating force to the bogie beam during braking,
wherein the front end region and the rear end region of the bogie beam are arranged to position the bogie pivot axis below the plane intersecting the axes of rotation of the first and second wheel assemblies when the main strut is in the deployed condition relative to the mounting lug, and
wherein the front end region and the rear end region each extend from the central body portion at an angle of between 20° and 70°.

2. An aircraft landing gear assembly comprising:
a main strut having a mounting lug at one end region via which the main strut is arranged to be pivotally coupled to an aircraft so as to be movable between a stowed condition for flight and a deployed condition for take-off and landing;
an elongate bogie beam pivotally coupled to the main strut via a bogie pivot pin;
a first axle mounted at a front end region of the bogie beam, the first axle being arranged to carry one or more first wheel assemblies and first brake assemblies, each first brake assembly being coupled to the first axle or the bogie beam such that the first axle or the bogie beam inhibits rotation of the first brake assembly relative to the first axle when braking;
a second axle mounted at a rear end region of the bogie beam, with the bogie pivot pin between the front end region and the rear end region, the second axle being arranged to carry one or more second wheel assemblies and second brake assemblies;
a double acting actuator coupled between the main strut and the bogie beam to apply a compressive or tensile force to the bogie beam; and
a controller configured to control operation of the actuator,
wherein the bogie pivot pin is located closer to the second axle than the first axle when the main strut is in the deployed condition relative to the mounting lug; and
wherein the controller is configured to cause the actuator to apply a pushing force to the bogie beam when the aircraft weight on wheels is detected and the first brake assemblies and the second brake assemblies are not braking in order to achieve a substantially even weight distribution between the first and second wheel assemblies.

3. The aircraft landing gear assembly according to claim 2, wherein the controller is configured to cause the actuator to reduce the pushing force applied to the bogie beam in accordance with a detected level of brake torque applied to the first and second wheel assemblies.

4. The aircraft landing gear assembly according to claim 3, wherein the controller is configured to cause the actuator to apply a pulling force to the bogie while a relatively high level of brake torque is detected as being applied to the first and second wheel assemblies.

5. The aircraft landing gear assembly according to claim 2, wherein the controller is configured to cause the actuator to apply a pulling force to the bogie during taxiing turning manoeuvres to lift the first wheel assemblies off the ground during taxiing turning manoeuvres.

6. The aircraft landing gear assembly according to claim 2, wherein the controller is configured to cause the actuator to position the bogie beam so as to be parallel with respect to a longitudinal axis of the aircraft.

7. The aircraft landing gear assembly according to claim 1, wherein:
the first axle defines a first wheel mounting portion on a first side of the bogie beam for supporting the first wheel assembly;

the second axle defines a second wheel mounting portion on the first side of the first bogie beam for supporting the second wheel assembly, the landing gear assembly further comprising:

a second elongate bogie beam including a second mounting formation, defining a second bogie pivot axis, via which the second bogie beam is arranged to be pivotally mounted to the aircraft landing gear main strut in a side by side adjacent relationship with the first bogie pivot axis being coaxial with respect to the second bogie pivot axis;

a third axle mounted at a front end region of the second bogie beam, the third axle defining a third wheel mounting portion on a second side of the second bogie beam for supporting a first wheel assembly, the second side facing away from the first bogie beam;

a fourth axle mounted at a rear end region of the second bogie beam, the fourth axle defining a fourth wheel mounting portion on the second side of the bogie beam for supporting a fourth wheel assembly.

8. The aircraft landing gear assembly according to claim 7, further comprising:

a second double acting actuator coupled between the main strut and the second bogie beam to apply a compressive or tensile force to the second bogie beam, wherein the bogie pivot pin is located closer to the fourth axle than the third axle.

9. The aircraft landing gear assembly according to claim 7, wherein the respective front end region and the respective rear end region of the first and second bogie beams are both arranged to position the bogie pivot axis below a plane intersecting the axes of rotation of the first to fourth wheel assemblies when the main strut is in the deployed condition.

10. The aircraft landing gear assembly according to claim 1, wherein each brake assembly is coupled to the axle on which the brake assembly is mounted or the bogie beam such that the axle upon which the brake assembly is mounted or the bogie beam inhibits rotation of the respective brake assembly relative to the respective axle when braking.

11. The aircraft landing gear assembly according to claim 1, wherein each brake assembly is attached to a brake rod which in turn is attached to the bogie beam.

12. An aircraft including one or more aircraft landing gear assemblies according to claim 1.

13. The aircraft landing gear assembly according to claim 2, wherein each brake assembly is coupled to the axle on which the brake assembly is mounted or the bogie beam such that the axle upon which the brake assembly is mounted or the bogie beam inhibits rotation of the respective brake assembly relative to the respective axle when braking.

14. The aircraft landing gear assembly according to claim 2, wherein each brake assembly is attached to a brake rod which in turn is attached to the bogie beam.

15. An aircraft including one or more aircraft landing gear assemblies according to claim 2.

16. An aircraft landing gear assembly comprising:

a main strut having a mounting lug at one end region via which the main strut is arranged to be pivotally coupled to an aircraft so as to be movable between a stowed condition for flight and a deployed condition for take-off and landing;

an elongate bogie beam pivotally coupled to the main strut via a bogie pivot pin;

a first axle mounted at a front end region of the bogie beam, the first axle being arranged to carry one or more first wheel assemblies and first brake assemblies, each first brake assembly being coupled to the first axle or the bogie beam such that the first axle or the bogie beam inhibits rotation of the first brake assembly relative to the first axle when braking;

a second axle mounted at a rear end region of the bogie beam, with the bogie pivot pin between the front end region and the rear end region, the second axle being arranged to carry one or more second wheel assemblies and second brake assemblies;

a double acting actuator coupled between the main strut and the bogie beam to apply a compressive or tensile force to the bogie beam; and a controller configured to control operation of the actuator;

wherein the bogie pivot pin is located closer to the second axle than the first axle when the main strut is in the deployed condition relative to the mounting lug; and wherein the controller is configured to cause the actuator to apply a pulling force to the bogie during taxiing turning manoeuvres to lift the first wheel assemblies off the ground during taxiing turning manoeuvres.

* * * * *